(12) United States Patent
Hammer et al.

(10) Patent No.: US 11,584,440 B2
(45) Date of Patent: Feb. 21, 2023

(54) ACTIVE RETRACTOR DEVICE FOR CONTROLLING WHEEL MOTION DURING CRASH

(71) Applicant: TOYOTA MOTOR ENGINEERING & MANUFACTURING NORTH AMERICA, INC., Plano, TX (US)

(72) Inventors: Jeremiah T. Hammer, Ann Arbor, MI (US); Mark Clauser, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 136 days.

(21) Appl. No.: 16/868,212

(22) Filed: May 6, 2020

(65) Prior Publication Data
US 2021/0347412 A1    Nov. 11, 2021

(51) Int. Cl.
*B62D 21/15* (2006.01)
*B62D 27/04* (2006.01)

(52) U.S. Cl.
CPC .............. *B62D 21/15* (2013.01); *B62D 27/04* (2013.01)

(58) Field of Classification Search
CPC .......... B62D 21/15; B62D 27/04; B62D 7/18; B62D 9/00; B60G 2204/4504; B60G 2206/016
USPC ........................................................ 180/274
See application file for complete search history.

(56) References Cited

U.S. PATENT DOCUMENTS

| | | | | |
|---|---|---|---|---|
| 4,836,321 A | * | 6/1989 | Baumann | B62D 21/15 180/291 |
| 5,947,223 A | * | 9/1999 | Rebmann | B60R 21/00 180/291 |
| 6,866,115 B2 | | 3/2005 | Miyasaka | |
| 8,303,030 B2 | * | 11/2012 | Baccouche | B60R 19/24 296/203.02 |
| 9,415,808 B2 | | 8/2016 | Onoda et al. | |
| 9,487,237 B1 | | 11/2016 | Vollmer | |
| 9,522,584 B2 | * | 12/2016 | Jensen | B60G 7/001 |
| 9,623,712 B2 | | 4/2017 | Sakaguchi | |
| 9,789,743 B2 | | 10/2017 | Donkai et al. | |
| 10,343,719 B2 | * | 7/2019 | Von Hasselbach | B62D 21/02 |
| 10,486,628 B2 | | 11/2019 | Grattan | |
| 10,501,035 B2 | | 12/2019 | Gupta et al. | |
| 10,889,326 B2 | * | 1/2021 | Klinger | B62D 21/15 |

(Continued)

FOREIGN PATENT DOCUMENTS

| | | | |
|---|---|---|---|
| DE | 10113098 A1 * | 9/2002 | .......... B62D 21/155 |
| DE | 102010021061 A1 | 1/2011 | |

(Continued)

*Primary Examiner* — Paul N Dickson
*Assistant Examiner* — Caitlin Anne Miller
(74) *Attorney, Agent, or Firm* — Haynes and Boone, LLP (57) ABSTRACT

Disclosed is a vehicular device comprising a tether. The tether is anchored at a first point to the frame of the vehicle, and at a second point to the knuckle of a front wheel of the vehicle, wherein the knuckle couples the front wheel to the frame. The locations of the first anchor point and second anchor point, along with the length of the tether and the routing of the tether within the vehicle, are selected such that in a collision event between the front wheel and a barrier, when the knuckle becomes separated from the frame, the motion of the front wheel is constrained to exert force on both the barrier and the frame of the vehicle.

17 Claims, 9 Drawing Sheets

(56) References Cited

U.S. PATENT DOCUMENTS

| | | | |
|---|---|---|---|
| 2015/0210315 A1* | 7/2015 | Maier | B60R 19/34 |
| | | | 180/280 |
| 2016/0144894 A1 | 5/2016 | Brar | |
| 2019/0023323 A1 | 1/2019 | Uehata | |
| 2019/0077349 A1 | 3/2019 | Saito et al. | |
| 2021/0138858 A1* | 5/2021 | Hammer | B60G 3/20 |

FOREIGN PATENT DOCUMENTS

| | | | |
|---|---|---|---|
| JP | 2002127936 A | * | 5/2002 |
| WO | WO2013159880 A1 | | 10/2013 |

* cited by examiner

ACTIVE RETRACTOR DEVICE FOR CONTROLLING WHEEL MOTION DURING CRASH

TECHNICAL FIELD

The subject matter described herein relates to a device, system, and method for improving motor vehicle safety during small overlap rigid barrier (SOL) frontal crashes. This device, system, and method has particular but not exclusive utility for automobiles and trucks.

BACKGROUND

Modern vehicles are designed with crash safety in mind. Crash safety is tested both physically (using actual crashes staged under laboratory conditions) and virtually (using computer models and numerical analysis) to determine the forces, accelerations, and deformations that a given vehicle design will experience in a given set of crash conditions. One particularly challenging scenario occurs during the frontal crash mode called small overlap rigid barrier (SOL), wherein a vehicle strikes a rigid barrier at ~25% overlap or less to the vehicle width. Due to this small overlap between the barrier and the vehicle, the main structural members of the vehicle frame are not directly contacted by the barrier, and the deformation to the vehicle cabin can therefore be severe. To avoid large deformations to the occupant area, it is advantageous to both engage these missed structural members and to push the vehicle away from the barrier. Engaging the structural members of the frame is beneficial, as it permits the structural members to absorb some of the energy of the crash outside of the occupant area (e.g., by bending or crumpling). Pushing the vehicle off the barrier is beneficial because some of the energy is transferred to lateral kinetic energy which will not need to be absorbed by the vehicle. This motion is also beneficial because the vehicle can escape the barrier sooner, which may reduce direct contact between the vehicle cabin and the barrier.

However, loading between a rigid barrier and a front wheel often leads to the fracture of chassis parts and a separation of the wheel from the vehicle. Current vehicle designs implement strong chassis members designed to fracture (separate) only at specific times, but allow free, uncontrolled wheel motion following the fracture. Depending on the exact post-fracture motion of the wheel, it may then be ejected from the wheel well or may become entrapped in the vehicle's passenger cabin envelope as the vehicle crushes during impact. Either result may increase the damage inflicted by the SOL barrier on the vehicle's passenger cabin.

Due to the complex nature of chassis part fracture and wheel dynamics, accurately predicting motion of the wheel after separation from the vehicle can be difficult. In general, wheel motion is not repeatable, and small changes in wheel motion can drastically change crash test results. SOL crashes may represent approximately 5% of overall crashes, but because they cause disproportionate vehicle damage and disproportionate risk of injury as compared to other crash types, they are of significant concern in vehicle design and testing. Thus, currently used front wheel assemblies have numerous drawbacks, including excessive cabin deformation during SOL crash events, and otherwise. Accordingly, a need exists for improved front wheel assemblies that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is a wheel retractor device that provides control over the post-fracture motion of a front wheel during collision events, including but not limited to small overlap rigid barrier (SOL) collision events. The retractor device controls loading between a wheel of the vehicle and the rigid barrier, and uses the wheel as a load path for pushing the vehicle away from the rigid barrier during a crash. The design disclosed herein includes a tether and a tensioning pyrotechnic, which together control the timing of front wheel separation and the possible motions of a separated front wheel during the crash event. The tether may be anchored to the vehicle frame and the wheel knuckle, and may either remain anchored, or may break free when a pre-defined force is exerted on it. When the tether becomes taut and while it remains attached at both ends, the tethered wheel can act as a frame member, applying force to the barrier. This can improve energy absorption and lateral pushing against the barrier, thus helping the vehicle to push away from the barrier. This may reduce total energy transfer between the barrier and vehicle, as well as rendering crash results more predictable and consistent.

The wheel retractor device structure disclosed herein has particular, but not exclusive, utility for collision mitigation in automobiles and trucks. One general aspect of the wheel retractor device includes a device comprising a tether having a first anchor point, a second anchor point, a length, and a routing within a vehicle, where the first anchor point couples the tether to a frame of the vehicle, where the second anchor point couples the tether to a knuckle of a front wheel of the vehicle, the knuckle coupling the front wheel to the frame, where a location of the first anchor point, a location of the second anchor point, the length, and the routing are selected such that in a collision event between the front wheel and a barrier, when the knuckle becomes separated from the frame, a motion of the front wheel is constrained to exert force on the barrier and the frame of the vehicle.

Implementations may include one or more of the following features. The device where the motion of the front wheel is constrained to exert tensile force on the frame of the vehicle via the tether. The device where the motion of the front wheel is constrained to exert compressive force on the frame of the vehicle by placing the front wheel on a load path between the barrier and at least a portion of the frame of the vehicle. The device where the motion of the front wheel is constrained such that a front portion of the front wheel rotates inward toward the vehicle. The device where the motion of the front wheel is constrained such that a front portion of the front wheel rotates outward away from the vehicle. The device further including a tensioner to shorten the tether when a triggering event is detected. The device where the tensioner includes a piston or a winder. The device where the tensioner is pyrotechnically actuated. The device where the tensioner is actuated by a motor. The device where the triggering event is a deceleration of the vehicle detected by an accelerometer. The device further including the vehicle. Implementations of the described techniques may include hardware, a method or process, or computer software on a computer-accessible medium.

One general aspect includes a method comprising providing a tether having a length; anchoring a first end of the tether to a first anchor point on a frame of a vehicle; anchoring a second end of the tether to a second anchor point on a knuckle of a front wheel of the vehicle; routing the tether along a path between the frame of the vehicle and the knuckle of the front wheel of the vehicle; and selecting a location of the first anchor point, a location of the second anchor point, the length, and the routing such that in a collision event between the front wheel and a barrier, when the knuckle becomes separated from the frame, a motion of the front wheel is constrained to exert force on the barrier and the frame of the vehicle. Other embodiments of this aspect include corresponding computer systems, apparatus, and computer programs recorded on one or more computer storage devices, each configured to perform the actions of the methods.

Implementations may include one or more of the following features. The method where the motion of the front wheel is constrained to: exert tensile force on the frame of the vehicle via the tether, or exert compressive force on the frame of the vehicle by placing the front wheel on a load path between the barrier and at least a portion of the frame of the vehicle. The method where the motion of the front wheel is constrained such that a front portion of the front wheel rotates inward toward the vehicle. The method where the motion of the front wheel is constrained such that a front portion of the front wheel rotates outward away from the vehicle. The method further including: detecting a triggering event; and based on the detecting, shortening the tether with a tensioning piston or winder. The method further including actuating the tensioning piston or winder with a pyrotechnic charge or a motor. The method where the triggering event is a deceleration of the vehicle detected by an accelerometer. Implementations of the described techniques may include hardware, a method or process, or computer software on a computer-accessible medium.

One general aspect includes a system for distributing crash energy within a vehicle. The system includes the vehicle; a frame of the vehicle; a front wheel of the vehicle; a knuckle coupling the front wheel to the frame; and a tether having a first anchor point, a second anchor point, a length, and a routing within the vehicle, where the first anchor point couples the tether to the frame, where the second anchor point couples the tether to the knuckle, where a location of the first anchor point, a location of the second anchor point, the length, and the routing are selected such that in a collision event between the front wheel and a barrier, when the knuckle becomes separated from the vehicle, the motion of the front wheel is constrained to exert a first compressive force on the barrier, and: a tensile force on the frame of the vehicle via the tether, or a second compressive force on the frame of the vehicle by placing the front wheel on a load path between the barrier and the frame of the vehicle. Other embodiments of this aspect include corresponding computer systems, apparatus, and computer programs recorded on one or more computer storage devices, each configured to perform the actions of the methods.

Implementations may include one or more of the following features. The system further including a tensioner to shorten the tether when a deceleration of the vehicle is detected by an accelerometer, where the tensioner includes a pyrotechnically actuated piston or winder. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the wheel retractor device, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

In accordance with at least one embodiment of the present disclosure, a wheel retractor device structure is disclosed that provides one or more additional novel structural members that control the post-fracture motion of a front wheel during collision events, including but not limited to a small overlap rigid barrier (SOL) collision events. To avoid large deformations to an occupant area of the vehicle's cabin, it is advantageous to control loading between a wheel or tire of the vehicle and the rigid barrier, and to use the wheel as a load path for pushing the vehicle away from the rigid barrier during a crash event. The design disclosed herein includes a tether and a deceleration-activated pyrotechnic tensioning mechanism, which together control the timing of front wheel separation and the possible motions of a separated front wheel during deceleration and crushing of the vehicle frame in a crash event. The tether may be anchored at one end to the vehicle frame, and at the other end to the front wheel knuckle, and may either remain anchored during the collision event, or may break free when a pre-defined force is exerted on it. When the tether becomes taut and while it remains attached at both ends, the tethered wheel can act as an energy-absorbing frame member, applying force to the barrier. This can improve energy absorption through crumpling of the vehicle frame, and can also improve lateral pushing against the barrier, thus helping the vehicle to push away from the barrier earlier in the collision event. This may in turn reduce total energy transfer between the barrier and vehicle, as well as rendering crash results more predictable and consistent.

These descriptions are provided for exemplary purposes only, and should not be considered to limit the scope of the wheel retractor device. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Figure 1:
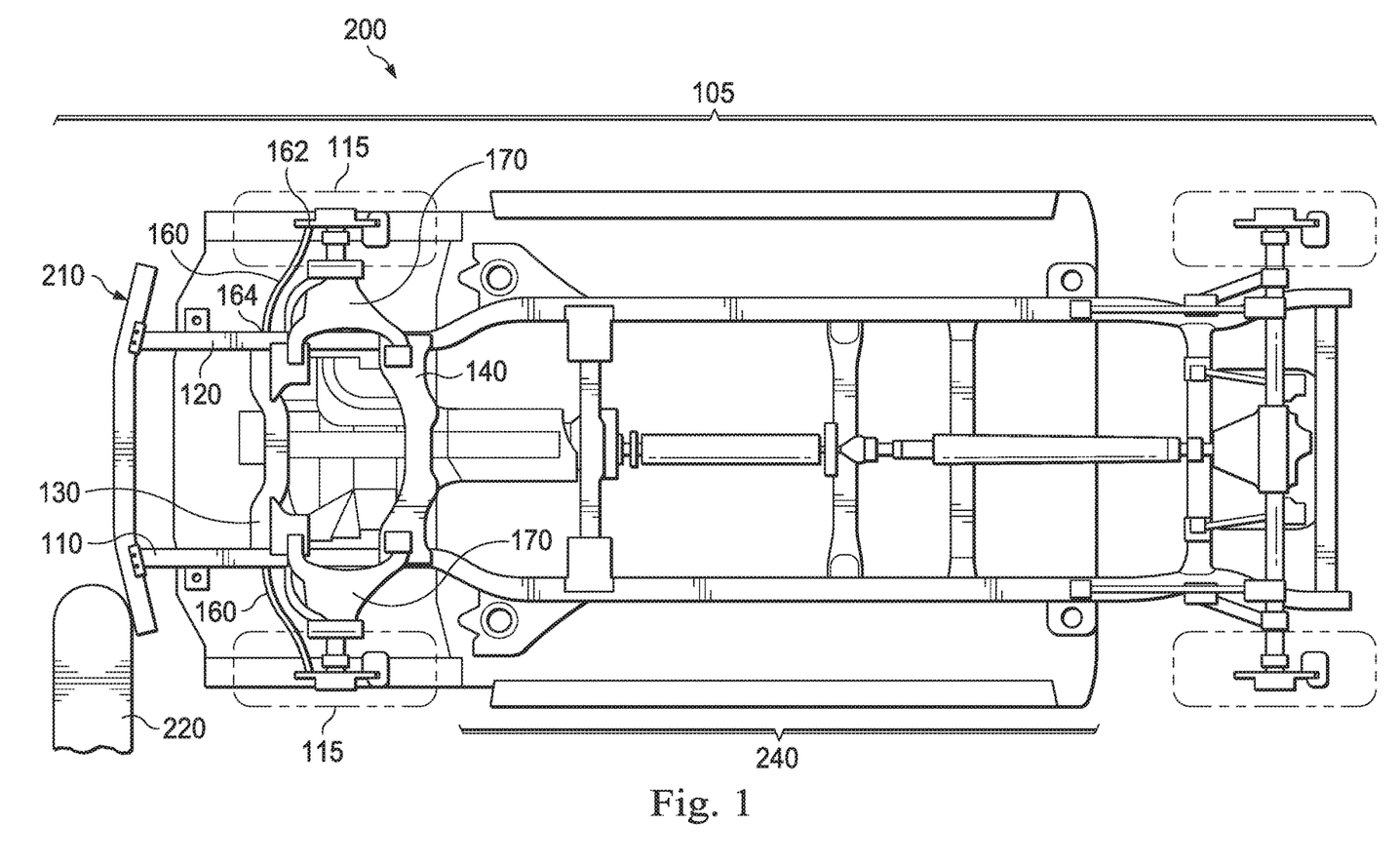
FIG. 1 is a bottom view of an example frame of a vehicle that incorporates wheel retractor devices in accordance with at least one embodiment of the present disclosure.

FIG. 1 is a bottom view of an example vehicle frame 105 of a vehicle 200 that incorporates wheel retractor tethers or wheel retractor devices 160 in accordance with at least one embodiment of the present disclosure. Visible are the left-hand frame rail 110, right hand frame rail 120, No. 1 frame cross member 130, and No. 2 frame cross member 140. The vehicle frame also includes a bumper beam 210, and supports a cabin or vehicle occupant area 240. Protecting the vehicle occupant area 240 from excessive deceleration or intrusion during an SOL collision event is a feature of the present disclosure. Also visible are the front wheels 115 and wheel retractor tethers or wheel retractor devices 160, which include a wheel knuckle anchor 162 and a frame anchor 164.

In SOL collisions and other collisions, the front wheel knuckle can fracture, which permits uncontrolled motion of the front wheel and uncontrolled intrusion of the wheel and/or the SOL barrier into the passenger cabin 240. In this case, deformation to the cabin 240 may be particularly severe. To avoid large deformations to the cabin 240, it may be advantageous to control loading between a front wheel or front tire 115 of the vehicle 200 and the rigid barrier 220. It then becomes possible to use the wheel as a load path for pushing the vehicle away from the rigid barrier during a crash. Due to the complex nature of chassis part fracture and dynamics of the wheel, accurately controlling motion of the wheel after separation from the vehicle can be difficult. In general, wheel motion is not repeatable, and small changes in wheel motion can drastically change crash test results. However, controlling wheel motion may also increase stability during crash, and thus improve the consistency or predictability of crash results. In an example, the tethers 160 are steel or Kevlar® cables, although other materials may be used instead or in addition.

Although the SOL barrier 220 is shown here with a particular size and shape, it should be understood that an SOL barrier may be or include any fixed barrier such as a wall, sign post, telephone pole, light pole, concrete divider, guard rail, bridge abutment, tree, etc., or may in some cases be or include a large movable object such as a vehicle, wild animal, boulder, etc., and that other types of barriers (e.g., head-on collisions) may cause similar damage patterns to those described above.

Before continuing, it should be noted that the examples described above are provided for purposes of illustration, and are not intended to be limiting. Other devices and/or device configurations may be utilized to carry out the operations described herein.

Figure 2:
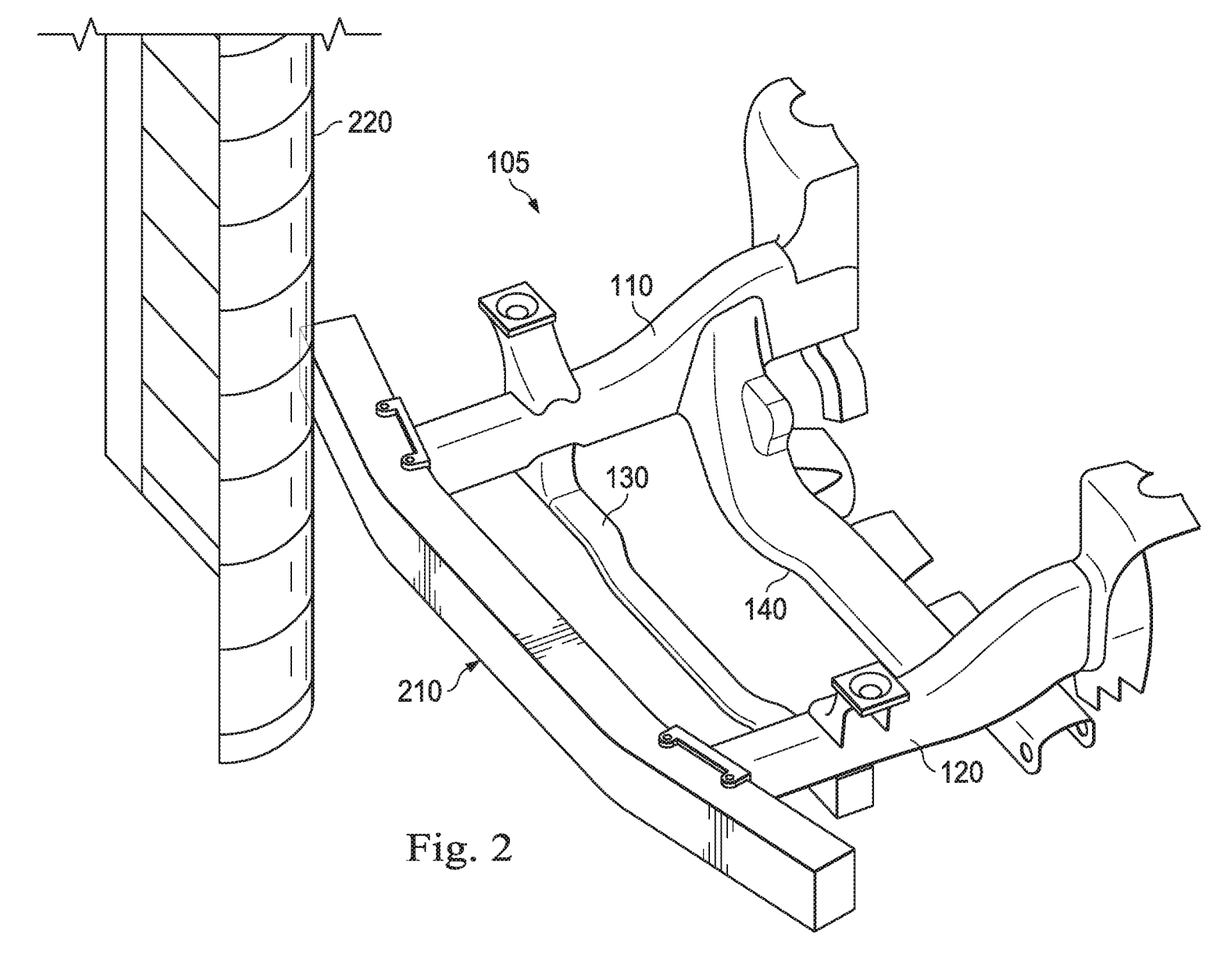
FIG. 2 is a perspective view of an example bumper beam being contacted by an SOL barrier in accordance with at least one embodiment of the present disclosure.

FIG. 2 is a perspective view of an example bumper beam 210, being contacted by an SOL barrier 220 in accordance with at least one embodiment of the present disclosure. The frame 105 includes the bumper beam 210, right frame rail 110, left frame rail 120, No. 1 frame cross member 130, and No. 2 frame cross member 140.

Figure 3:
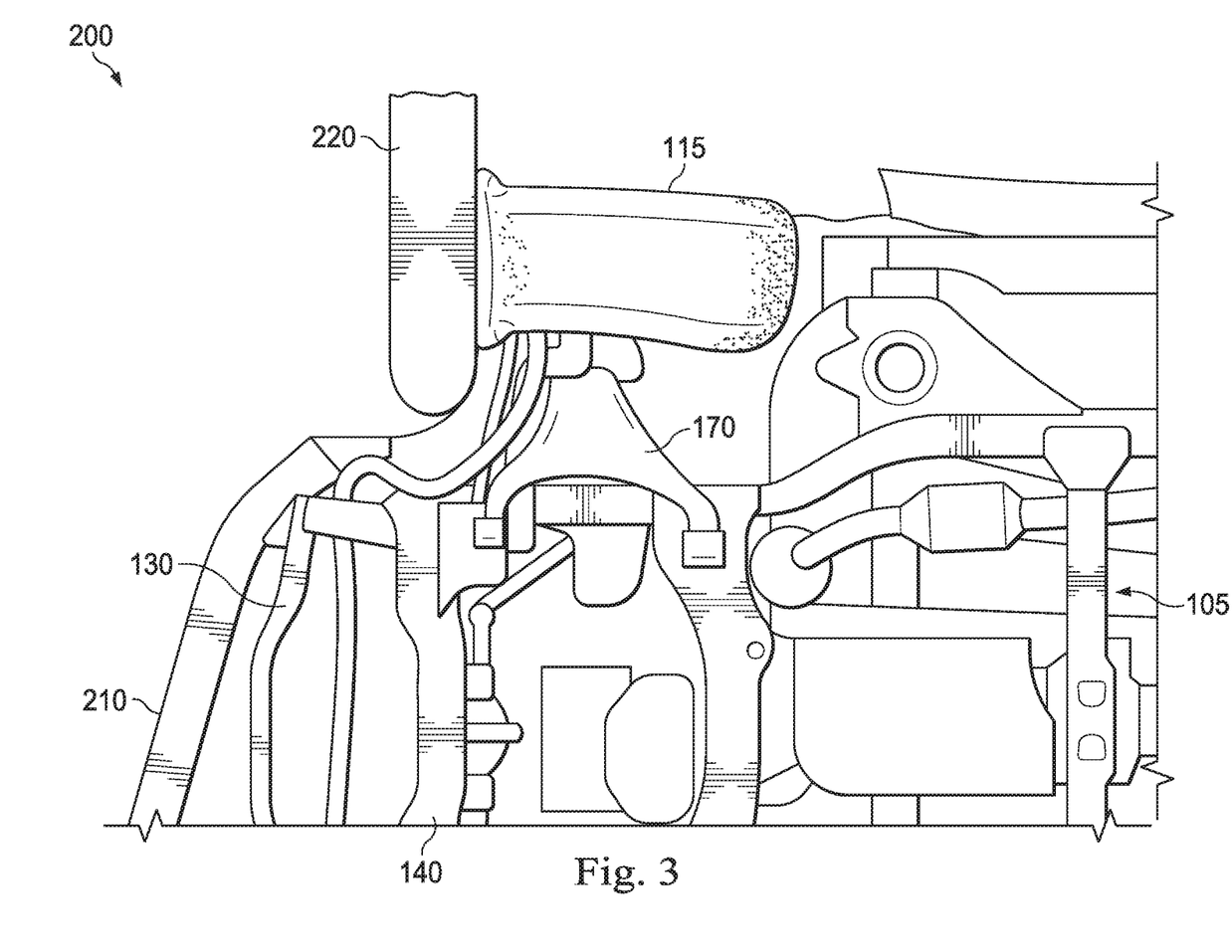
FIG. 3 is a bottom view of an example front wheel, being contacted by an SOL barrier and deformed in accordance with at least one embodiment of the present disclosure

FIG. 3 is a bottom view of an example front wheel 115, being contacted by an SOL barrier 220 and deformed in accordance with at least one embodiment of the present disclosure. The frame 105 of the vehicle 200 includes the bumper beam 210, right frame rail 110, No. 1 frame cross member 130, and No. 2 frame cross member 140. The wheel 115 is attached to the frame 105 by a suspension member or suspension element 170, such as a lower control arm. In the example shown in FIG. 3, the barrier 220 has bent or sheared the end of the bumper beam 210, such that the barrier 220 can directly contact the front wheel 115.

Figure 4:
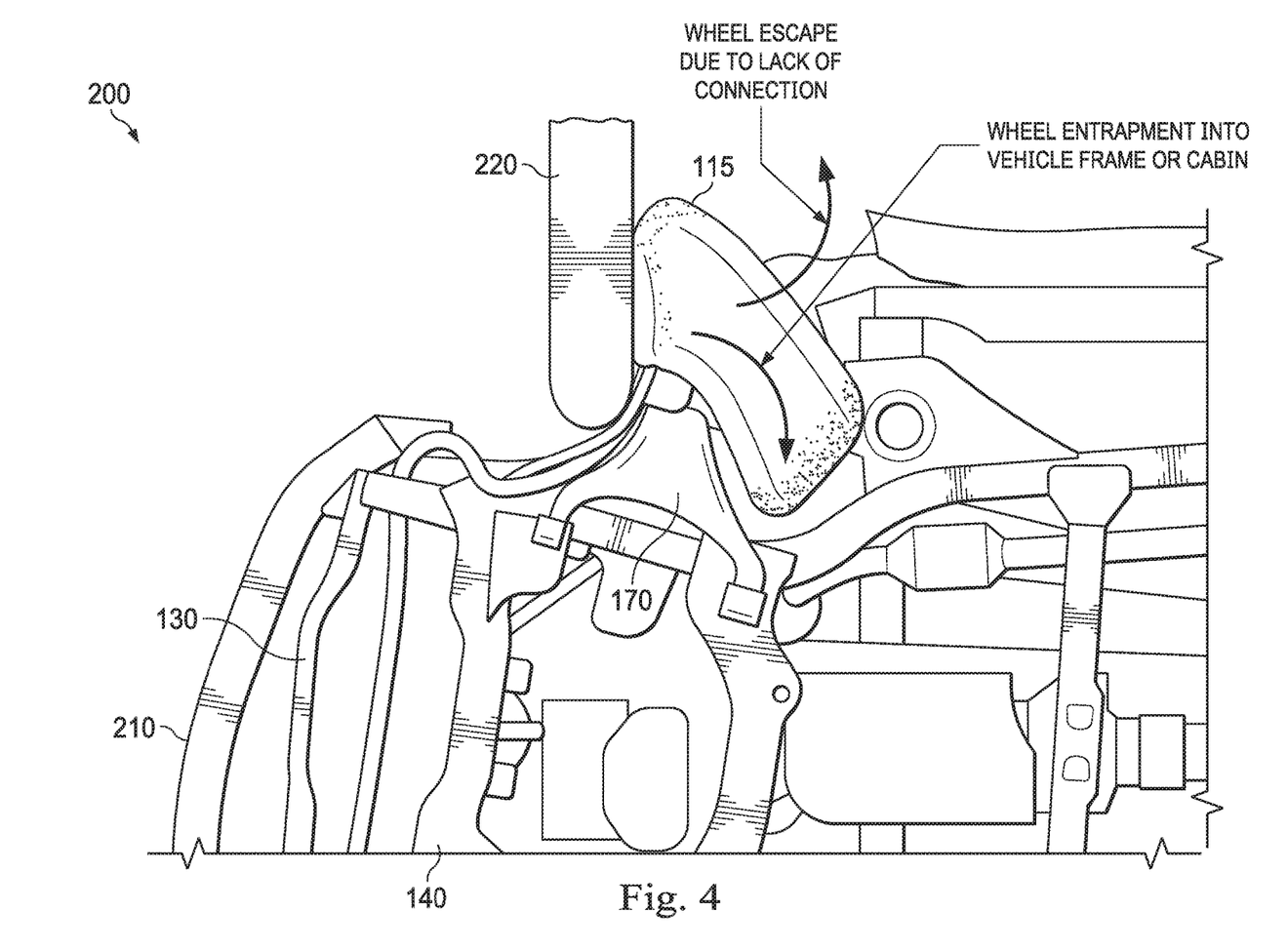
FIG. 4 is a bottom view of an example front wheel, being contacted by an SOL barrier and displaced relative to the rest of the vehicle in accordance with at least one embodiment of the present disclosure.

FIG. 4 is a bottom view of an example front wheel 115, being contacted by an SOL barrier 220 and displaced relative to the rest of the vehicle 200 in accordance with at least one embodiment of the present disclosure. The frame 105 of the vehicle 200 includes the bumper beam 210, right frame rail 110, No. 1 frame cross member 130, and No. 2 frame cross member 140, and a suspension member or suspension element 170 connecting the wheel to the frame. In many cases, the wheel can only displace through a certain angle or distance before fracturing away from the suspension member 170.

Current vehicle designs implement strong chassis members designed to fracture or separate only at specific times, but which allow free, uncontrolled wheel motion following the fracture. For example, when a wheel 115 contacts a rigid barrier 220, wheel rotation can cause a chassis part to fracture. Upon fracture, the wheel may push into the vehicle and become entrapped, leading to stackup in undesired locations or at undesired times during the crash event. Alternatively, the wheel 115 may escape the vehicle since it is no longer connected to the chassis, which removed the wheel from the load path and can result in the barrier 210 directly contacting the vehicle cabin. This limits the amount of collision energy absorbed by the vehicle frame 105, and thereby limits the ability of the vehicle frame 105 to transfer, redirect, absorb, or dissipate the SOL collision energy. As a result, decelerations of and intrusions into the passenger cabin 240 may be severe (e.g., unsafe for vehicle occupants) even during fairly low-speed SOL collisions. Furthermore, part fracture is somewhat unpredictable unless fracture points are specifically integrated into the chassis member. However, specifically integrated fracture points can result in unwanted fracture during other operations, such as during off-roading, hard cornering, etc.

Figure 5:
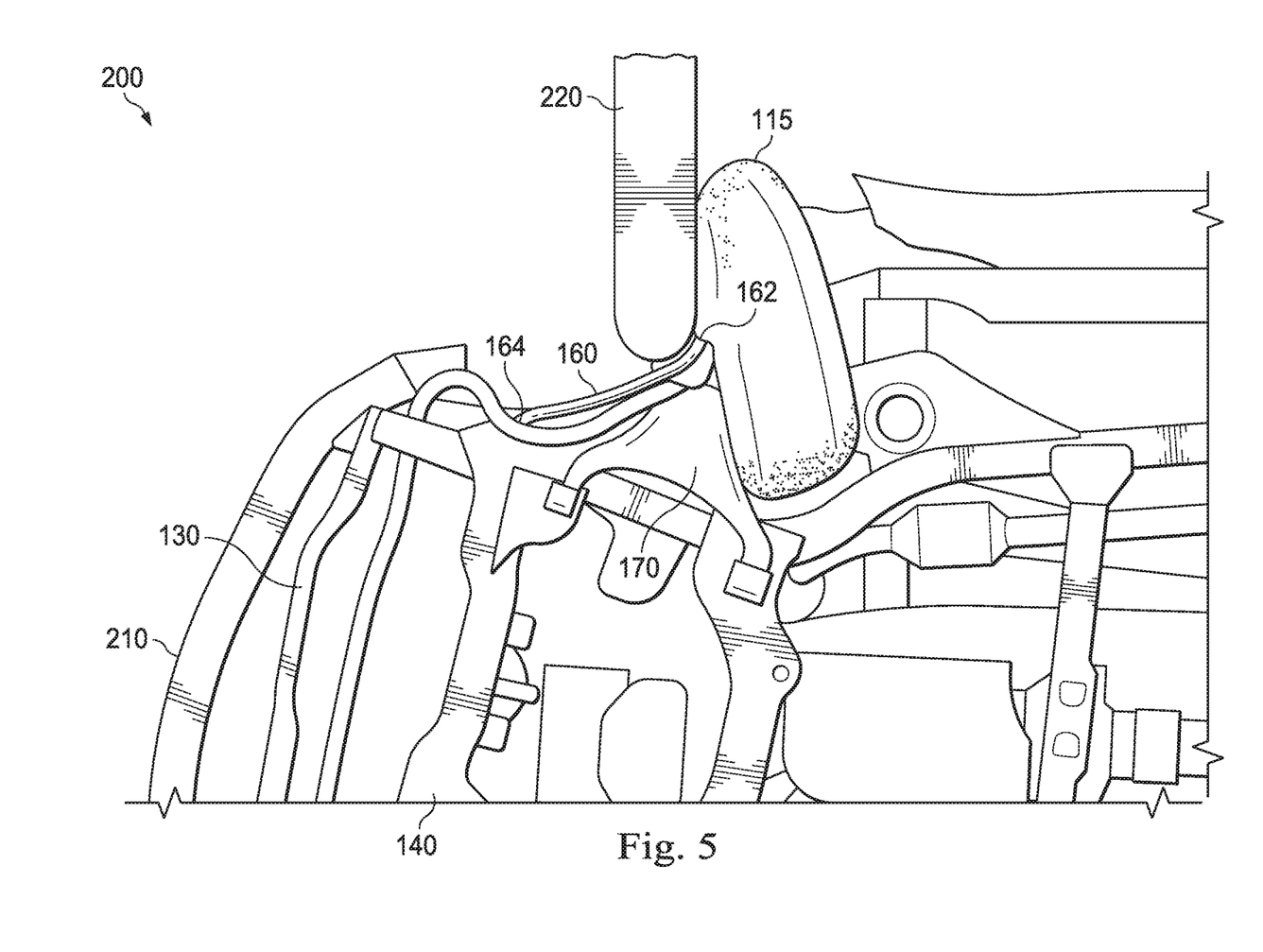
FIG. 5 is a bottom view of an example front wheel, being contacted by an SOL barrier and displaced relative to the rest of the vehicle in accordance with at least one embodiment of the present disclosure.

FIG. 5 is a bottom view of an example front wheel 115, being contacted by an SOL barrier 220 and displaced relative to the rest of the vehicle 200 in accordance with at least one embodiment of the present disclosure. The frame 105 of the vehicle 200 includes the bumper beam 210, right frame rail 110, No. 1 frame cross member 130, and No. 2 frame cross member 140, and a suspension member or suspension element 170 connecting the wheel to the frame.

Some current vehicle frame designs (for example, for F1 racing) implement inactive tether systems to connect a wheel to a vehicle frame after it has separated from the vehicle frame during a crash, preventing the wheel from being fully ejected from the vehicle and thus reducing risk of the wheel striking a driver in an open-air cockpit. Such tether systems are not used for actively and accurately controlling wheel motion.

By contrast, the present disclosure includes a tether 160 with a wheel knuckle anchor point 162 and a frame anchor point 164, wherein the positioning of the anchor points and the length and routing of the tether are selected to constrain the motion of a front wheel 115 before and/or after separation from a chassis of a vehicle during a crash, such as an SOL crash. The active wheel motion control system is designed to force or direct the wheel 115 along a beneficial path to maximize lateral motion away from a rigid barrier 220, and to direct force away from sensitive areas of the vehicle 200, while also placing the wheel 115 between the barrier and rigid frame parts, thus permitting kinetic energy from the barrier to be transferred into the frame rather than the vehicle cabin. In the example shown in FIG. 5, motion of the wheel 115 is not yet sufficient to pull taut the tether 160, and thus the tether 160 is slack.

Wheel motion can be tuned by varying attachment location 162 of the tether to the knuckle, varying attachment location 164 of the tether to the vehicle frame, varying the length of the tether 160, varying the strength of the tethers 160, varying the routing of the tethers 160, altering tearing modes or other failure modes of the tether 160, and adding a pyrotechnic tensioner as described below in FIG. 8. The tether 160 provides a lighter-weight option for controlling wheel motion than current solutions directed to strengthening the vehicle's chassis components and/or parts.

Figure 6:
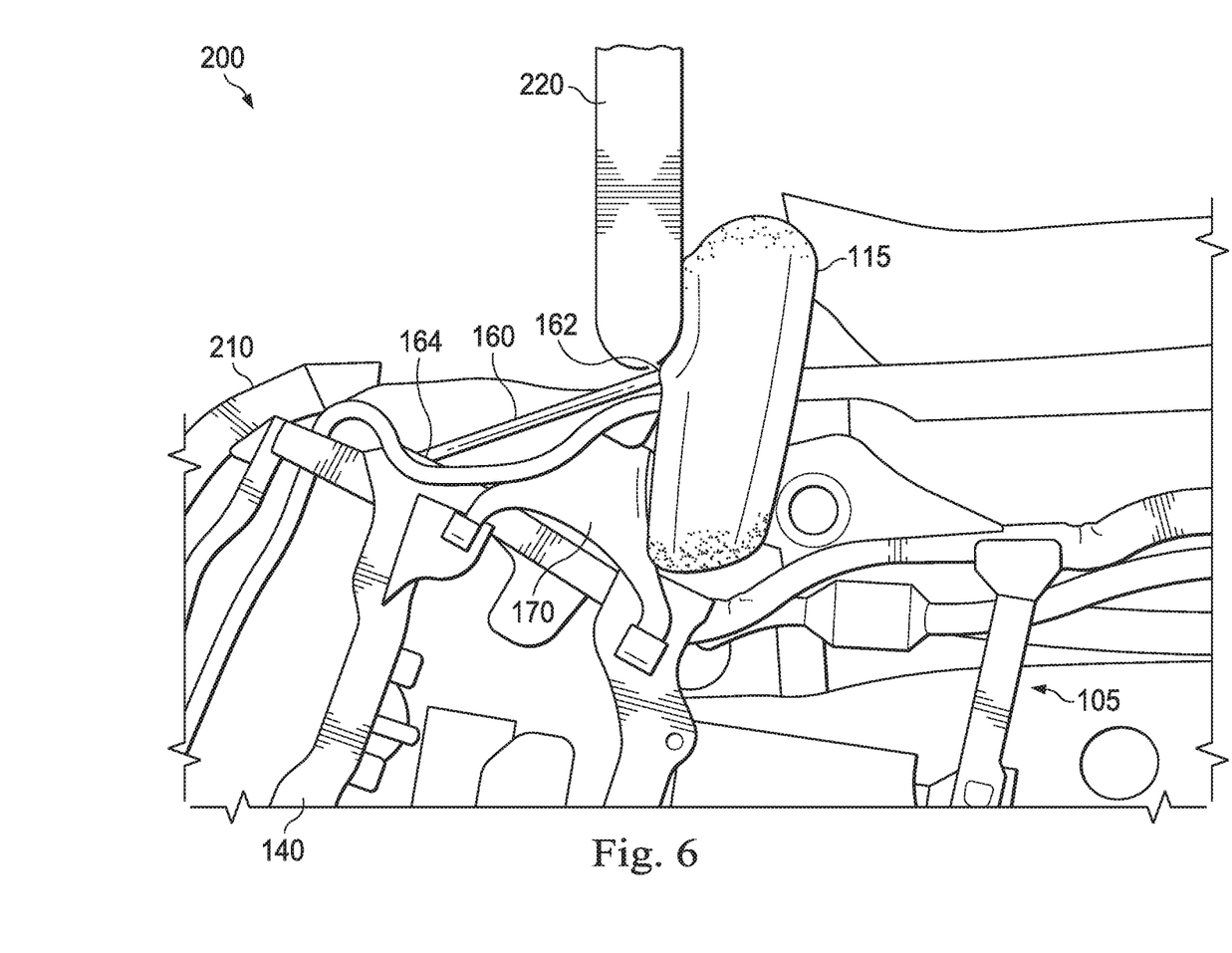
FIG. 6 is a bottom view of an example front wheel, being contacted by an SOL barrier and displaced relative to the rest of the vehicle in accordance with at least one embodiment of the present disclosure.

FIG. 6 is a bottom view of an example front wheel 115, being contacted by an SOL barrier 220 and displaced relative to the rest of the vehicle 200 in accordance with at least one embodiment of the present disclosure. The frame 105 of the vehicle 200 includes the bumper beam 210, right frame rail 110, No. 1 frame cross member 130, and No. 2 frame cross member 140, and a suspension member or suspension element 170 connecting the wheel to the frame. In the example shown in FIG. 6, the motion of the wheel 115 has been sufficient to pull taut the tether 160, such that it provides a tension force or pulling force between the wheel knuckle anchor point 162 and the frame anchor point 164. This permits the wheel to exert force on the vehicle frame rather than the passenger cabin. Depending on the vehicle design, the location of the anchor points 162 and 164, and the length and routing of the tether 160, this tension force may also constrain the motion of the wheel 115 such that it becomes part of the compressive load path between the barrier 220 and the vehicle frame 105, and not between the barrier 220 and the vehicle cabin.

During a collision event, the barrier 220 may apply a compressive force or pushing force to the wheel 115. When the tether 160 pulls taut, the tensile force created between the knuckle anchor point 162 and the frame anchor point 164 allows a portion of the compressive energy delivered by the barrier 220 against the wheel 115 to be absorbed, redirected, dissipated, or attenuated by the vehicle frame 105. Additionally, if the wheel 115 is constrained to move such that it is positioned between the barrier 220 and one or more portions of the frame 105, then at least a portion of the compressive energy delivered by the barrier 220 against the wheel 115 may be transferred compressively to the vehicle frame, where it can be absorbed, redirected, dissipated, or attenuated.

In some embodiments, the tether 160 can be held to the vehicle frame 140 with clips or other features configured to break away at a specific loading, allowing for wheel motion control for a certain duration of the crash event, and permitting free motion of the wheel 115 (e.g., ejection of the wheel from the vehicle) thereafter.

Figure 7:
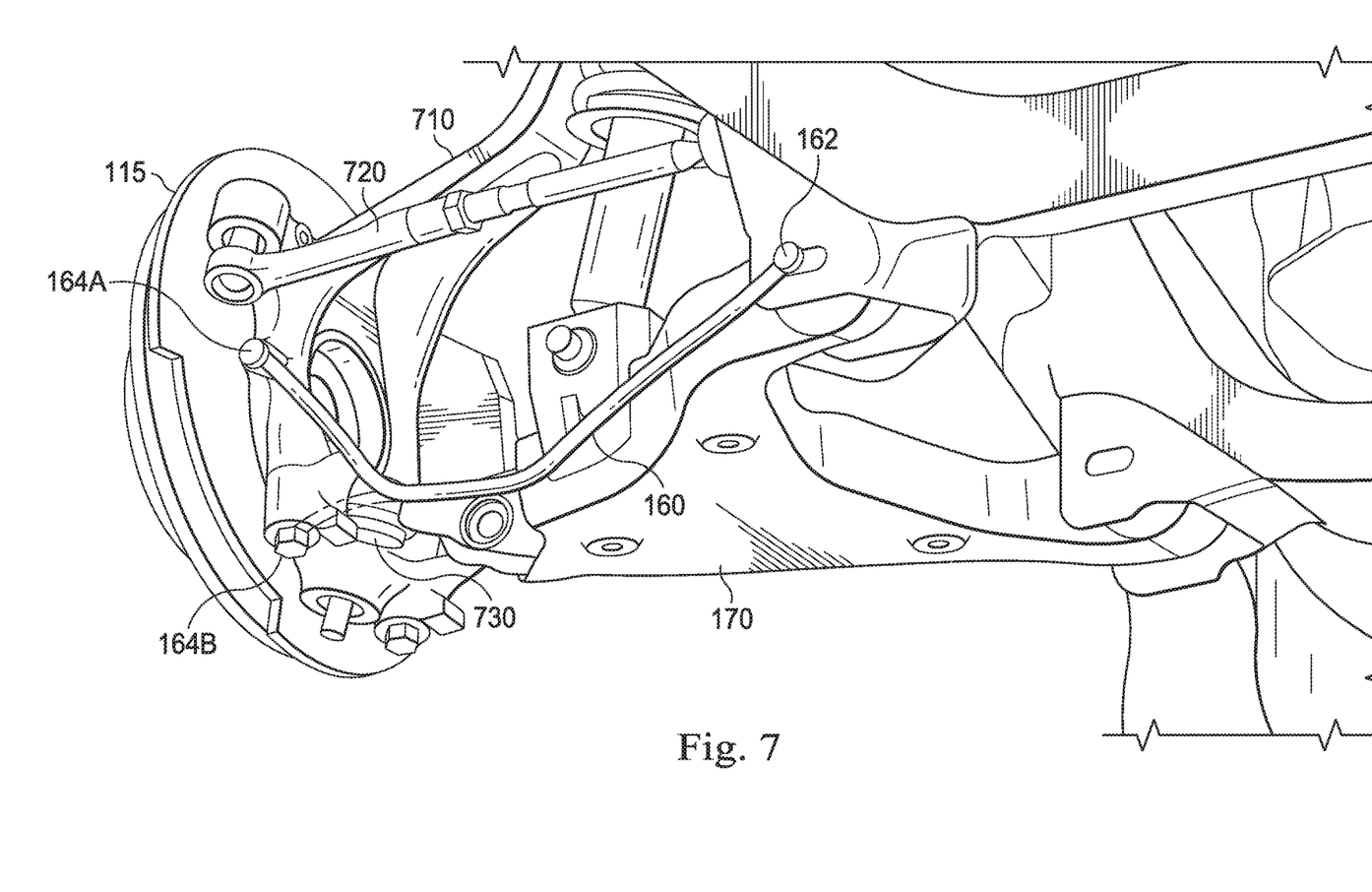
FIG. 7 is a bottom front perspective view of an example vehicle wheel retractor device or tether in accordance with at least one embodiment of the present disclosure.

FIG. 7 is a bottom front perspective view of an example wheel retractor device or tether 160 in accordance with at least one embodiment of the present disclosure. Visible are the wheel 115, knuckle 710, tie rod 720, ball joint 730, lower control arm or suspension element 170. The tether 160 is routed in such a way that, when slack, it does not interfere with the operation of other components and may, for example, be held to frame or suspension elements along middle portions of its length with clips or brackets designed to fail and release the middle portions of the tether 160 as the tether 160 pulls taut. In this example, for a given frame attachment point 162, the tether 160 has two different possible wheel knuckle attachment points 164A and 164B, each of which may provide different wheel dynamics during a crash event. A person of ordinary skill in the art will appreciate that other routings and other attachment points may be employed instead or in addition, and may be desirable for different crash scenarios and/or different vehicle designs.

Figure 8:
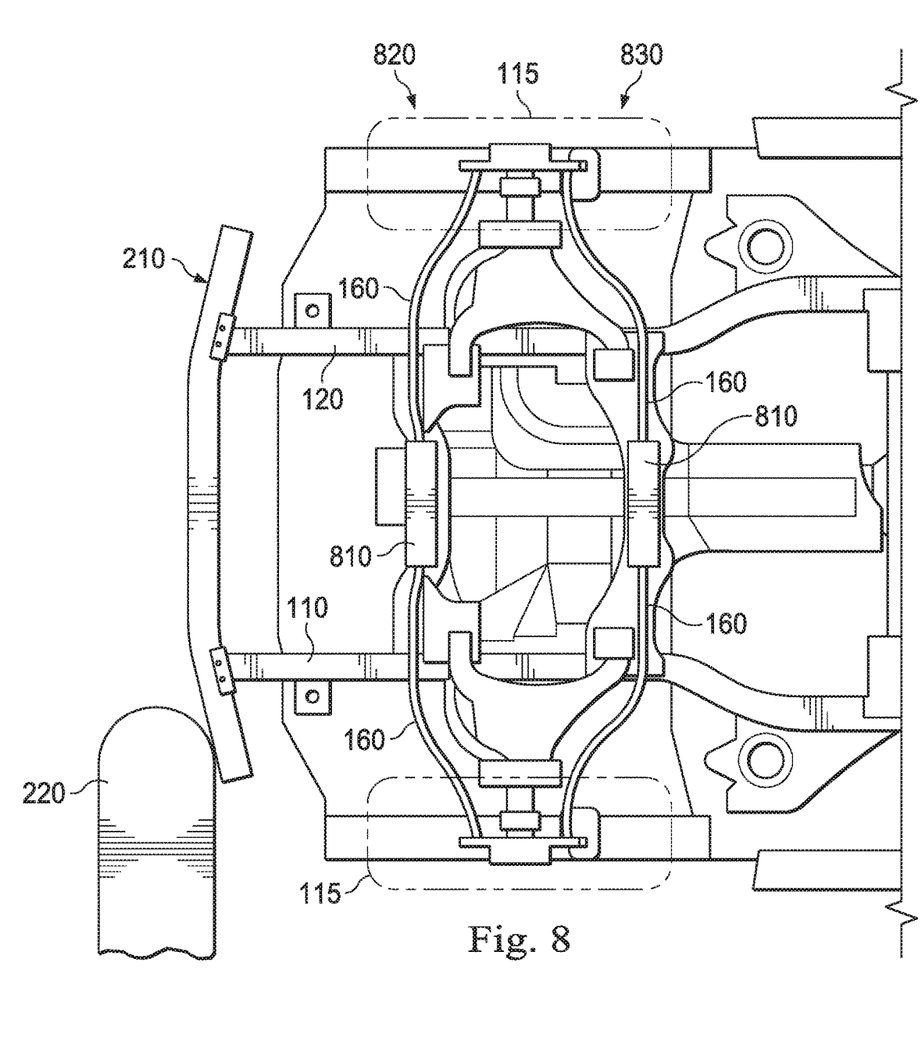
FIG. 8 is a bottom view of example wheel retractor devices or tethers in accordance with at least one embodiment of the present disclosure.

FIG. 8 is a bottom view of example wheel retractor devices or wheel retractor tethers 160 in accordance with at least one embodiment of the present disclosure. Visible are the wheels 115, right frame rail 110, left frame rail 120, and bumper beam 210. In addition, FIG. 8 shows left and right wheel retractor tethers or wheel retractor devices 160, in both a forward (in front of the wheel) configuration 820 and an aft (behind the wheel) configuration 830. In this example, each tether 160 is controlled by a pyrotechnically actuated tensioner 810 which may, for example, be a piston or a winder, and may be activated by sudden deceleration of the vehicle as detected by an integrated accelerometer. The tether tensioner 810 may (in a manner similar to a seatbelt pre-tensioner) provide tension to a tether 160 such that when a pyrotechnic charge is activated, a piston or winder shortens or applies tension to the tether 160, such that the tether 160 creates a desired torque or pulling force on the wheel 115 to which the tether 160 is attached. The pyrotechnic charge may for example be electrically activated, e.g., by overloading an electrical fuse with a current to produce an ignition flash, which ignites an explosive material that produces a rapid exothermic reaction, yielding an expanding gas. Automotive pyrotechnic charges may be used for example to inflate airbags, sever electrical connections, and actuate seatbelt tensioners during a collision or rollover event.

A person of ordinary skill in the art will appreciate that the forward configuration 820 will pull the wheel 115 such that the front of the wheel 115 turns inward toward the vehicle, whereas the aft configuration 830 will pull the wheel 115 such that the front of the wheel 115 turns outward away from the vehicle. Depending on the implementation, the deceleration-triggered, pyrotechnically actuated tether tensioners 810 may be used to control wheel motion before the wheel 115 contacts a barrier, after the wheel 115 contacts the barrier but before it separates from the frame, or after separation of the wheel 115 from the vehicle's suspension.

Figure 9:
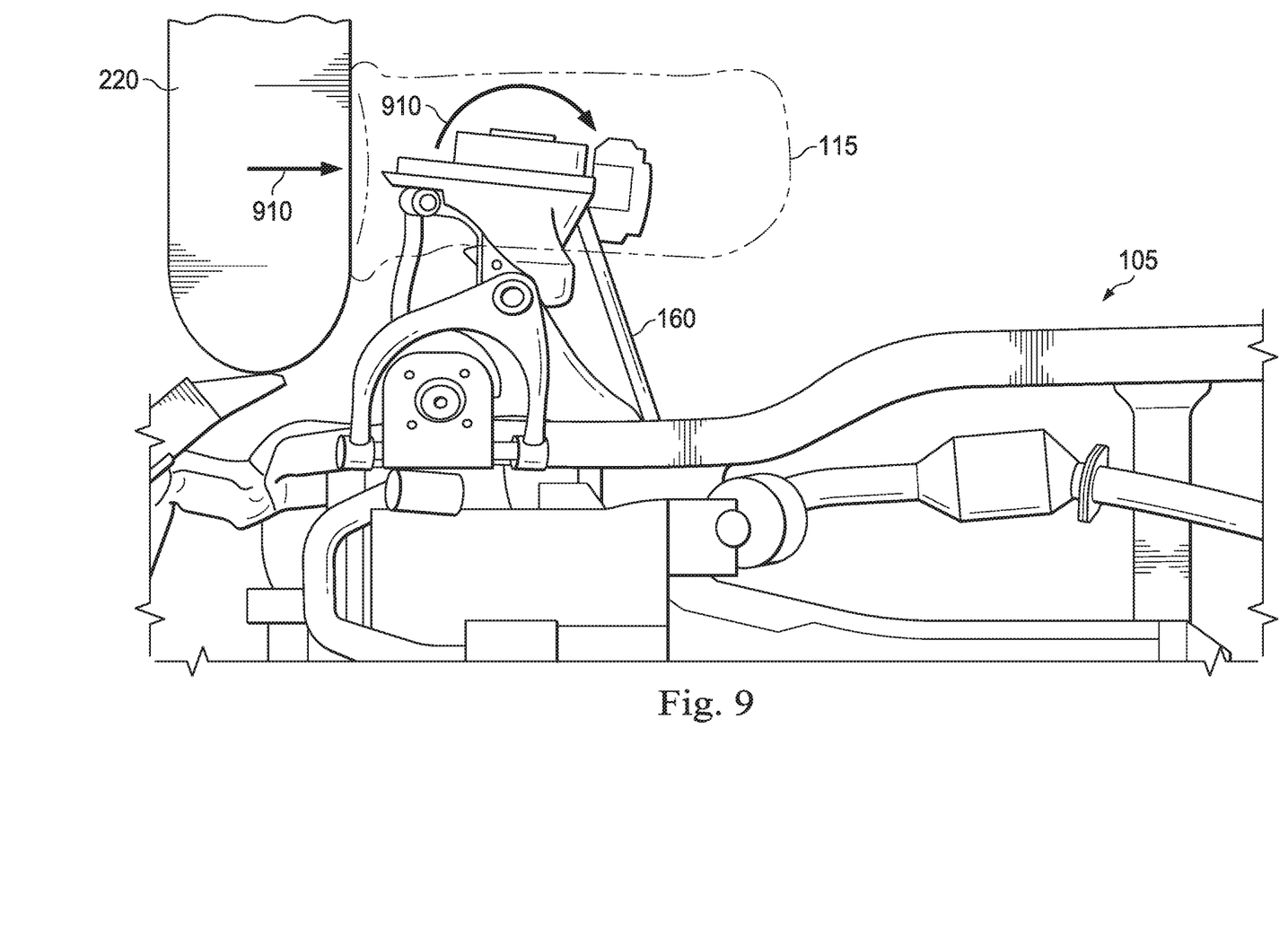
FIG. 9 is a bottom view of an example wheel retractor device or tether in accordance with at least one embodiment of the present disclosure.

FIG. 9 is a bottom view of an example wheel retractor device or tether 160 in accordance with at least one embodiment of the present disclosure. In the example shown in FIG.

9, the tether 160 is located behind the wheel 115, such that it creates a clockwise torque that rotates the front of the wheel 115 away from the vehicle. Combined with the force 910 imparted on the wheel 115 by the barrier 220, this torque 910 guides the wheel 115 on a desirable path such that it can help push the vehicle away from the barrier 220, and such that it becomes part of a tensile and/or compressive load path between the barrier 220 and the vehicle frame 105.

Accordingly, it can be seen that the wheel retractor device offers substantial improvement, by improving passenger safety in the challenging frontal crash mode called small overlap rigid barrier (SOL), wherein a vehicle strikes a rigid barrier at ~25% overlap or less to the vehicle width. The wheel retractor device permits advantageous positioning of the wheel during a crash event, thus improving load distribution and energy dissipation, and reducing deformation of the vehicle cabin.

Depending on the implementation, the wheel retractor device may be made from a variety of different materials, including but not limited to metals, composites, ceramics, and polymers. Wheel retractor device members may be hollow or solid so as to provide a high degree of control over wheel positioning during an SOL collision event, with low added weight. Motion of the wheel may be constrained or controlled about any or all of an X, Y, or Z axis of the vehicle. Multiple tethers may be used for the same wheel (e.g., each designed to release at a different time or force level), or a single tether may be used for the wheel but with multiple anchor points (e.g., each designed to release at a different time or force level). Motors and/or pyrotechnics can be integrated into the tethers and/or the vehicle's steering mechanism to control wheel motion. In addition to the tethers, current vehicle components, such as tie rods, can be used to control wheel motion with a steering motor or other device. Fast motors may be powered for example with an ultracapacitor that releases a burst of electrical current when triggered by an accelerometer, serving a similar function to a pyrotechnically actuated piston or winder. Attachment may be with bolts, screws, rivets, rods, pins, clips, brackets, adhesives, welds, or otherwise, and may be to various portions of the wheel knuckle, suspension elements, or vehicle frame. Furthermore, a number of variations are possible on the examples and embodiments described above. For example, the components could be longer, shorter, wider, thicker or of different shape than depicted herein, and may be oriented or angled in alternative manners that serve the same purpose of constraining the wheel to move in advantageous ways during a crash event. The technology described herein may be employed in automobiles and trucks of diverse type and design, regardless of their underlying propulsion technologies.

Accordingly, the logical operations making up the embodiments of the technology described herein are referred to variously as operations, steps, objects, elements, components, or modules. It should be understood that these may occur in any order, unless explicitly claimed otherwise or a specific order is inherently necessitated by the claim language.

In some implementations, the components are bolted together to reduce cost. In other embodiments, multiple parts are welded together or co-formed as single parts. It should further be understood that the described technology may be employed in other vehicle types, whether motorized or not, including but not limited to vans, minivans, SUVs, crossover vehicles, RVs, trailers, mobile homes, and food trucks.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the wheel retractor device. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the wheel retractor device as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A device comprising:
   a tether having a first anchor point, a second anchor point, a length, and a routing within a vehicle,
   wherein the first anchor point directly couples the tether to a frame rail, cross member, or bumper beam of a frame of the vehicle,
   wherein the second anchor point directly couples the tether to a knuckle of a front wheel of the vehicle, the knuckle coupling the front wheel to the frame,
   wherein a location of the first anchor point, a location of the second anchor point, the length, and the routing are selected such that in a collision event between the front wheel and a barrier, when the knuckle becomes separated from the frame, a motion of the front wheel is constrained to exert force on the barrier and the frame of the vehicle,
   further comprising a tensioner to shorten the tether when a triggering event is detected.

2. The device of claim 1, wherein the motion of the front wheel is constrained to exert tensile force on the frame of the vehicle via the tether.

3. The device of claim 1, wherein the motion of the front wheel is constrained to exert compressive force on the frame of the vehicle by placing the front wheel on a load path between the barrier and at least a portion of the frame of the vehicle.

4. The device of claim 1, wherein the motion of the front wheel is constrained such that a front portion of the front wheel rotates inward toward the vehicle.

5. The device of claim 1, wherein the motion of the front wheel is constrained such that a front portion of the front wheel rotates outward away from the vehicle.

6. The device of claim 1, wherein the tensioner comprises a piston or a winder.

7. The device of claim 1, wherein the tensioner is pyrotechnically actuated.

8. The device of claim 1, wherein the tensioner is actuated by a motor.

9. The device of claim 1, wherein the triggering event is a deceleration of the vehicle detected by an accelerometer.

10. The device of claim 1, further comprising the vehicle.

11. A method comprising:
providing a tether having a length;
directly anchoring a first end of the tether to a first anchor point on a frame rail, cross member, or bumper beam of a frame of a vehicle;
directly anchoring a second end of the tether to a second anchor point on a knuckle of a front wheel of the vehicle;
routing the tether along a path between the frame of the vehicle and the knuckle of the front wheel of the vehicle; and
selecting a location of the first anchor point, a location of the second anchor point, the length, and the routing such that in a collision event between the front wheel and a barrier, when the knuckle becomes separated from the frame, a motion of the front wheel is constrained to exert force on the barrier and the frame of the vehicle,
further comprising:
detecting a triggering event; and
based on the detecting, shortening the tether with a tensioning piston or winder.

12. The method of claim 11, wherein the motion of the front wheel is constrained to:
exert tensile force on the frame of the vehicle via the tether, or
exert compressive force on the frame of the vehicle by placing the front wheel on a load path between the barrier and at least a portion of the frame of the vehicle.

13. The method of claim 11, wherein the motion of the front wheel is constrained such that a front portion of the front wheel rotates inward toward the vehicle.

14. The method of claim 11, wherein the motion of the front wheel is constrained such that a front portion of the front wheel rotates outward away from the vehicle.

15. The method of claim 11, further comprising actuating the tensioning piston or winder with a pyrotechnic charge or a motor.

16. The method of claim 11, wherein the triggering event is a deceleration of the vehicle detected by an accelerometer.

17. A system for distributing crash energy within a vehicle, comprising:
the vehicle;
a frame of the vehicle, wherein the frame comprises a frame rail, a cross member, or a bumper beam;
a front wheel of the vehicle;
a knuckle coupling the front wheel to the frame; and
a tether having a first anchor point, a second anchor point, a length, and a routing within the vehicle,
wherein the first anchor point directly couples the tether to the frame rail, cross member, or bumper beam of the frame,
wherein the second anchor point directly couples the tether to the knuckle,
wherein a location of the first anchor point, a location of the second anchor point, the length, and the routing are selected such that in a collision event between the front wheel and a barrier, when the knuckle becomes separated from the vehicle, a motion of the front wheel is constrained to exert a first compressive force on the barrier, and:
a tensile force on the frame of the vehicle via the tether, or
a second compressive force on the frame of the vehicle by placing the front wheel on a load path between the barrier and the frame of the vehicle, further comprising a tensioner to shorten the tether when a deceleration of the vehicle is detected by an accelerometer,
wherein the tensioner comprises a pyrotechnically or electrically actuated piston or winder.

* * * * *